US008619568B2

(12) United States Patent
Ding et al.

(10) Patent No.: US 8,619,568 B2
(45) Date of Patent: Dec. 31, 2013

(54) REASSIGNMENT OF DISTRIBUTED PACKET FLOWS

(75) Inventors: Hui Ding, Chapel Hill, NC (US); Alastair Marcus Palmer, Milton Keynes (GB); Neil Robert Ketley, Marlow (GB); Lei Feng, Cary, NC (US); Peyman Owladi, Harpenden (GB)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 13/021,084

(22) Filed: Feb. 4, 2011

(65) Prior Publication Data

US 2012/0201135 A1    Aug. 9, 2012

(51) Int. Cl.
H04L 12/26    (2006.01)
H04L 12/56    (2011.01)
G06F 15/173    (2006.01)

(52) U.S. Cl.
USPC ... 370/230.1; 370/237; 370/389; 370/395.32; 370/412; 709/241

(58) Field of Classification Search
USPC .............. 370/230, 230.1, 236, 237, 238, 252, 370/367, 386–387, 388, 38, 395.3, 395.5; 709/224, 241–242
See application file for complete search history.

(56) References Cited

U.S. PATENT DOCUMENTS

| | | | |
|---|---|---|---|
| 6,735,173 B1 | 5/2004 | Lenoski et al. | |
| 6,826,186 B1 | 11/2004 | Dittia et al. | |
| 7,016,305 B1 | 3/2006 | Michelson et al. | |
| 7,474,654 B2 * | 1/2009 | Guru | 370/389 |
| 8,036,226 B1 * | 10/2011 | Ma et al. | 370/395.21 |
| 8,111,611 B2 | 2/2012 | Kapoor et al. | |
| 8,218,553 B2 * | 7/2012 | Kompella | 370/395.5 |
| 8,243,598 B2 * | 8/2012 | Battestilli et al. | 370/230.1 |
| 8,259,585 B1 * | 9/2012 | S P et al. | 370/237 |
| 8,264,959 B2 * | 9/2012 | Licardie et al. | 370/230.1 |
| 8,488,456 B2 * | 7/2013 | Battestilli et al. | 370/230 |
| 2008/0298236 A1 * | 12/2008 | Ervin et al. | 370/232 |
| 2010/0254409 A1 * | 10/2010 | Lu et al. | 370/477 |
| 2011/0051602 A1 * | 3/2011 | Matthews et al. | 370/235 |
| 2011/0164503 A1 * | 7/2011 | Yong et al. | 370/237 |
| 2012/0281541 A1 | 11/2012 | Palmer et al. | |
| 2013/0142036 A1 | 6/2013 | Kapadia et al. | |

* cited by examiner

Primary Examiner — Candal Elpenord
(74) Attorney, Agent, or Firm — The Law Office of Kirk D. Williams (57) ABSTRACT

In one embodiment, packet flows are distributed among groups, such as, but not limited to, queues or links. For example in the context of a bundled interface in which multiple links appear as a single logical interface on each of the sender and receiver, packet flows are distributed among these multiple links by the sender. When one or more links become unavailable, packet flows of the affected links are reassigned to other active links, while packet flows assigned to the unaffected links remain associated with the same link in contrast to prior systems which do not attempt to preserve prior associations between packet flows and links. By maintaining these associations, the receiver of the packets does not need to adjust to the different arrival links of packet flows.

19 Claims, 9 Drawing Sheets

REASSIGNMENT OF DISTRIBUTED PACKET FLOWS

TECHNICAL FIELD

The present disclosure relates generally to communicating packets over multiple links, and reassignment of packet flows to different links especially when one or more links are no longer available.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity. Data communication connections at link speeds of 1.544 Mbit/s (T1) or 2.048 Mbit/s (E1) are widely available from service providers today. As enterprise networks and their connection to the global Internet become more a business critical resource, the bandwidth requirements may grow beyond the capacity of a single T1 or E1 link. If a single connection at T1/E1 speed is not sufficient to satisfy the bandwidth requirements, ready solutions are not always available. Upgrading the link to higher speeds is often not possible as the next level in the digital transmission hierarchy is at 45 Mbps (T3) or 34 Mbps (E3) link speeds. In many cases, these lines are prohibitively expensive or may not even be available. Even if the lines are available, the required bandwidth may be far below T3/E3 speeds and the link would be underutilized. Unless the telecommunications carrier is offering specific leased line services at speeds between T1/E1 and T3/E3, which is rare, upgrading the link is often economically not feasible. Hence, multilink bundled services are offered which aggregate multiple slower rate links and provide a logical appearance as a single, faster rate service.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with the reassignment of distributed packet flows among groups, such as, but not limited to, queues or links. One embodiment includes a packet switching device and/or a method performed by the packet switching device (e.g., by a bundled interface). Multiple packet flows are distributed across multiple groups consisting of a first plurality of groups and a particular group. At least one packet flow is distributed to each group, and with a particular plurality of packet flows being said distributed to the particular group. Subsequently, when the particular group is unavailable and each of the first plurality of groups is available: the packet switching device maintains distributing these packet flows to the first plurality of groups as when all of the groups were available, and evenly distributes the particular plurality of packet flows across the first plurality of groups. In one embodiment, each of the plurality of groups corresponds to different, non-overlapping sets of one or more physical links. In one embodiment, each of the plurality of groups corresponds to different, non-overlapping sets of one or more queues.

For example in the context of a bundled interface in which multiple links appear as a single logical interface on each of the sender and receiver, packet flows are distributed among these multiple links by the sender. When one or more links become unavailable, packet flows of the affected links are reassigned to other active links, while packet flows assigned to the unaffected links remain associated with the same link in contrast to prior systems which do not attempt to preserve prior associations between packet flows and links. By maintaining these associations, the receiver of the packets does not need to adjust to the different arrival links of packet flows.

More formalistically, one embodiment includes a packet switching device which distributes a plurality of packet flows across K identifiable groups of N groups; wherein N>2; and wherein each of said K groups is the same identifiable group of said N groups when K<N and when K=N. Further, when K<N: each packet flow of the plurality of packet flows that would be distributed to one of said K groups when K=N is distributed to the same group of said K groups now with K<N, and the remaining packet flows of the plurality of packet flows that would not be distributed to one of said K groups when K=N are evenly distributed among said K groups now with K<N.

In one embodiment, each of said N groups corresponds to a different physical link, such as, but not limited to, being part of a bundled interface between two packet switching devices. In one embodiment, each of said N groups corresponds to a different queue. In one embodiment, the operation of distributing includes distributing at least one flow of the plurality of packet flows to each of said K groups. In one embodiment, the operation of evenly distributing includes: applying one or more hashing functions; and performing one or more lookup operations in one or more distribution tables populated to identify which of said K groups to said evenly distribute a particular packet of one of the plurality of packet flows.

In one embodiment, the operation of evenly distributing includes: for each particular packet of a plurality of particular packets of the plurality of packet flows: performing a lookup operation in a distribution table to determine to which particular group of said K groups to distribute the particular packet; and distributing the particular packet to the particular group. In one embodiment, when K<N: each of L entries in the distribution table is populated with a value for use in identifying a corresponding one of said K groups during said evenly distributing operation; wherein L is a least common multiple of K and N, or a multiple thereof. In one embodiment, each of said N groups corresponds to a different physical link.

In one embodiment, when K<N; said operation of evenly distributing includes: for each particular packet of a plurality of particular packets of the plurality of packet flows: performing a lookup operation in a first distribution table to identify to which particular group of said K groups to distribute the particular packet when so populated, and when not said populated with an identification corresponding to one of said K groups: to use a second distribution table to said identify to which said particular group of said K groups to said distribute the particular packet. In one embodiment, each of the entries in the first distribution table corresponding to one of said K groups is populated with the identification of a particular one of said K groups; and each entry in the first distribution table corresponding to a group no longer in said K groups, but was in said K groups when K=N, identifies an entry in the second distribution table which is populated with the identification of a particular one of said K groups. In one embodiment, each of said N groups corresponds to a different physical link. In one embodiment, a single bundled interface includes said N groups.

2. Description

Disclosed are, inter alia, methods, apparatus, computer-storage media, mechanisms, and means associated with the reassignment of distributed packet flows among groups, such as, but not limited to, queues or links. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with the reassignment of distributed packet flows among groups, such as, but not limited to, queues or links. One embodiment includes a packet switching device and/or a method performed by the packet switching device (e.g., by a bundled interface). Multiple packet flows are distributed across multiple groups consisting of a first plurality of groups and a particular group. At least one packet flow is distributed to each group, and with a particular plurality of packet flows being said distributed to the particular group. Subsequently, when the particular group is unavailable and each of the first plurality of groups is available: the packet switching device maintains distributing these packet flows to the first plurality of groups as when all of the groups were available, and evenly distributes the particular plurality of packet flows across the first plurality of groups. In one embodiment, each of the plurality of groups corresponds to different, non-overlapping sets of one or more physical links. In one embodiment, each of the plurality of groups corresponds to different, non-overlapping sets of one or more queues.

For example in the context of a bundled interface in which multiple links appear as a single logical interface on each of the sender and receiver, packet flows are distributed among these multiple links by the sender. When one or more links become unavailable, packet flows of the affected links are reassigned to other active links, while packet flows assigned to the unaffected links remain associated with the same link in contrast to prior systems which do not attempt to preserve prior associations between packet flows and links. By maintaining these associations, the receiver of the packets does not need to adjust to the different arrival links of packet flows.

More formalistically, one embodiment includes a packet switching device which distributes a plurality of packet flows across K identifiable groups of N groups; wherein N>2; and wherein each of said K groups is the same identifiable group of said N groups when K<N and when K=N. Further, when K<N: each packet flow of the plurality of packet flows that would be distributed to one of said K groups when K=N is distributed to the same group of said K groups now with K<N, and the remaining packet flows of the plurality of packet flows that would not be distributed to one of said K groups when K=N are evenly distributed among said K groups now with K<N.

In one embodiment, each of said N groups corresponds to a different physical link, such as, but not limited to, being part of a bundled interface between two packet switching devices. In one embodiment, each of said N groups corresponds to a different queue. In one embodiment, the operation of distributing includes distributing at least one flow of the plurality of packet flows to each of said K groups. In one embodiment, the operation of evenly distributing includes: applying one or more hashing functions; and performing one or more lookup operations in one or more distribution tables populated to identify which of said K groups to said evenly distribute a particular packet of one of the plurality of packet flows.

In one embodiment, the operation of evenly distributing includes: for each particular packet of a plurality of particular packets of the plurality of packet flows: performing a lookup operation in a distribution table to determine to which particular group of said K groups to distribute the particular packet; and distributing the particular packet to the particular group. In one embodiment, when K<N: each of L entries in the distribution table is populated with a value for use in identifying a corresponding one of said K groups during said evenly distributing operation; wherein L is a least common multiple of K and N, or a multiple thereof. In one embodiment, each of said N groups corresponds to a different physical link.

In one embodiment, when K<N; said operation of evenly distributing includes: for each particular packet of a plurality of particular packets of the plurality of packet flows: performing a lookup operation in a first distribution table to identify to which particular group of said K groups to distribute the particular packet when so populated, and when not said populated with an identification corresponding to one of said K groups: to use a second distribution table to said identify to which said particular group of said K groups to said distribute the particular packet. In one embodiment, each of the entries in the first distribution table corresponding to one of said K groups is populated with the identification of a particular one of said K groups; and each entry in the first distribution table corresponding to a group no longer in said K groups, but was in said K groups when K=N, identifies an entry in the second distribution table which is populated with the identification of a particular one of said K groups. In one embodiment, each of said N groups corresponds to a different physical link. In one embodiment, a single bundled interface includes said N groups.

Figure 1:
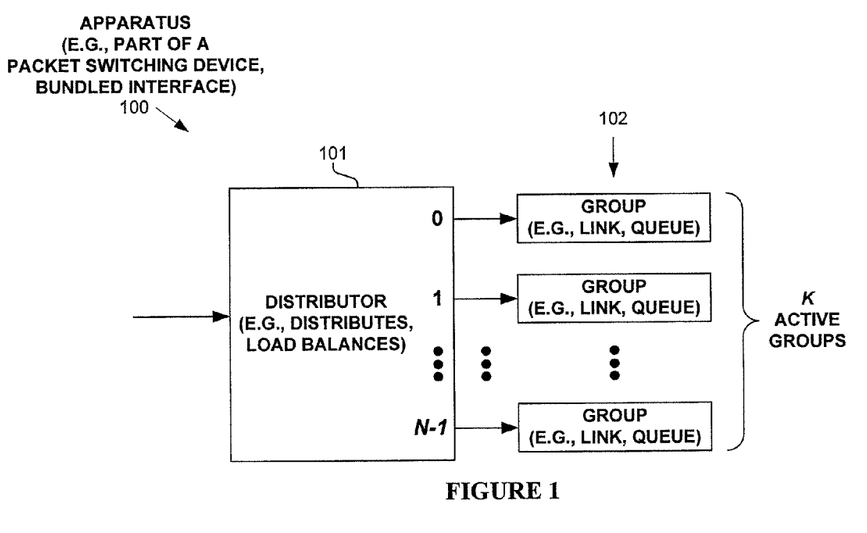
FIG. 1 illustrates an apparatus operating according to one embodiment.

Expressly turning to the figures, FIG. 1 illustrates an apparatus 100, such as, but not limited to, part of a packet switching device or bundled interface, of one embodiment. As shown, apparatus 100 includes a distributor 101 configured to distribute packet flows to N to groups 102 (e.g., links, queues), with K active groups. In one embodiment, distributor 101 evenly distributes and/or load balances these packet flows. Typically, it is desirable to communicate packets of a same flow over a same link or into a same queue so they remain in order. Typically a packet flow is determined from some fields of a header of a packet, such as, but not limited to, source address, destination address, source port, destination port, and protocol type.

In one embodiment, initially all N groups 102 are active (e.g., K=N). When one or more of the groups 102 become unavailable (e.g., K<N), packet flows of the affected groups (102) are reassigned to other of the K active groups (102), while packet flows assigned to the unaffected groups (102) remain associated with the same group (102) in contrast to prior systems which do not attempt to preserve prior associations between packet flows and groups (102). By maintaining these associations, the receiver of the packets does not need to adjust to the different arrival links of packet flows.

More formalistically, one embodiment includes a distributor 101 of a packet switching device that distributes a plurality of packet flows across K identifiable groups of N groups (102); wherein N>2; and wherein each of said K groups is the same identifiable group of said N groups (102) when K<N and when K=N. Further, when K<N: each packet flow of the plurality of packet flows that would be distributed to one of said K groups when K=N is distributed to the same group of said K groups now with K<N, and the remaining packet flows of the plurality of packet flows that would not be distributed to one of said K groups when K=N are evenly distributed among said K groups now with K<N.

In one embodiment, each of said N groups (102) corresponds to a different physical link, such as, but not limited to, being part of a bundled interface between two packet switching devices. In one embodiment, each of said N groups (102) corresponds to a different queue. In one embodiment, the operation of distributing includes distributing at least one flow of the plurality of packet flows to each of said K groups. In one embodiment, the operation of evenly distributing includes: applying one or more hashing functions; and performing one or more lookup operations in one or more distribution tables populated to identify which of said K groups to said evenly distribute a particular packet of one of the plurality of packet flows.

In one embodiment, the operation of evenly distributing includes: for each particular packet of a plurality of particular packets of the plurality of packet flows: performing a lookup operation in a distribution table to determine to which particular group of said K groups to distribute the particular packet; and distributing the particular packet to the particular group. In one embodiment, when K<N: each of L entries in the distribution table is populated with a value for use in identifying a corresponding one of said K groups during said evenly distributing operation; wherein L is a least common multiple of K and N, or a multiple thereof. In one embodiment, each of said N groups (102) corresponds to a different physical link.

In one embodiment, when K<N; said operation of evenly distributing includes: for each particular packet of a plurality of particular packets of the plurality of packet flows: performing a lookup operation in a first distribution table to identify to which particular group of said K groups to distribute the particular packet when so populated, and when not said populated with an identification corresponding to one of said K groups: to use a second distribution table to said identify to which said particular group of said K groups to said distribute the particular packet. In one embodiment, each of the entries in the first distribution table corresponding to one of said K groups is populated with the identification of a particular one of said K groups; and each entry in the first distribution table corresponding to a group no longer in said K groups, but was in said K groups when K=N, identifies an entry in the second distribution table which is populated with the identification of a particular one of said K groups. In one embodiment, each of said groups (102) corresponds to a different physical link. In one embodiment, a single bundled interface includes said N groups (102).

Figure 2A:
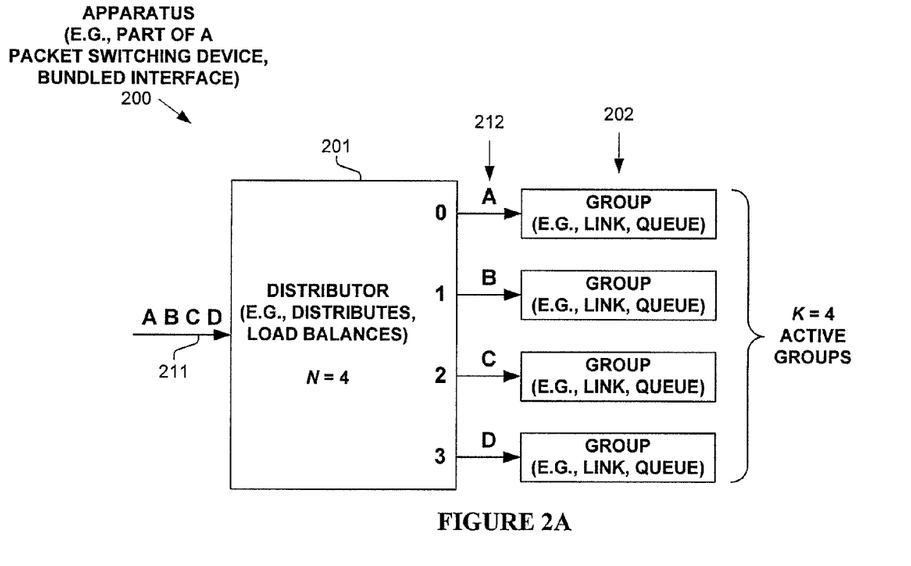
FIG. 2A illustrates an apparatus operating according to one embodiment.

FIG. 2A illustrates an apparatus 200 operating according to one embodiment. As shown, apparatus 200 includes a distributor 201 configured to distribute packet flows over N groups 202, with K of these groups being active.

To illustrate the operation of one embodiment, illustrated is N=4, with distributor 211 distributing four packet flows (or each being a set of one or more packet flows) designated A, B, C and D, which are distributed (212) to the four groups 202 as shown.

Figure 2B:
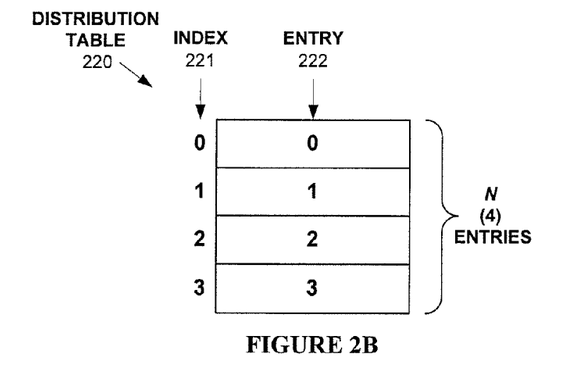
FIG. 2B illustrates a data structure used in one embodiment.

One embodiment uses a distribution table 220 illustrated in FIG. 2B to determine which active group of the N groups (202, FIG. 2A) to place a particular packet. In performing the distribution, one embodiment applies a hash function to a packet (and then possibly taking the remainder N–the number of entries in distribution table 220), to determine a value between zero and N−1, which identifies an index value 221 of distribution table 220. The value of the corresponding entry 222 identifies which of the N groups (202, FIG. 2A) to which to distribute the packet.

Figure 2C:
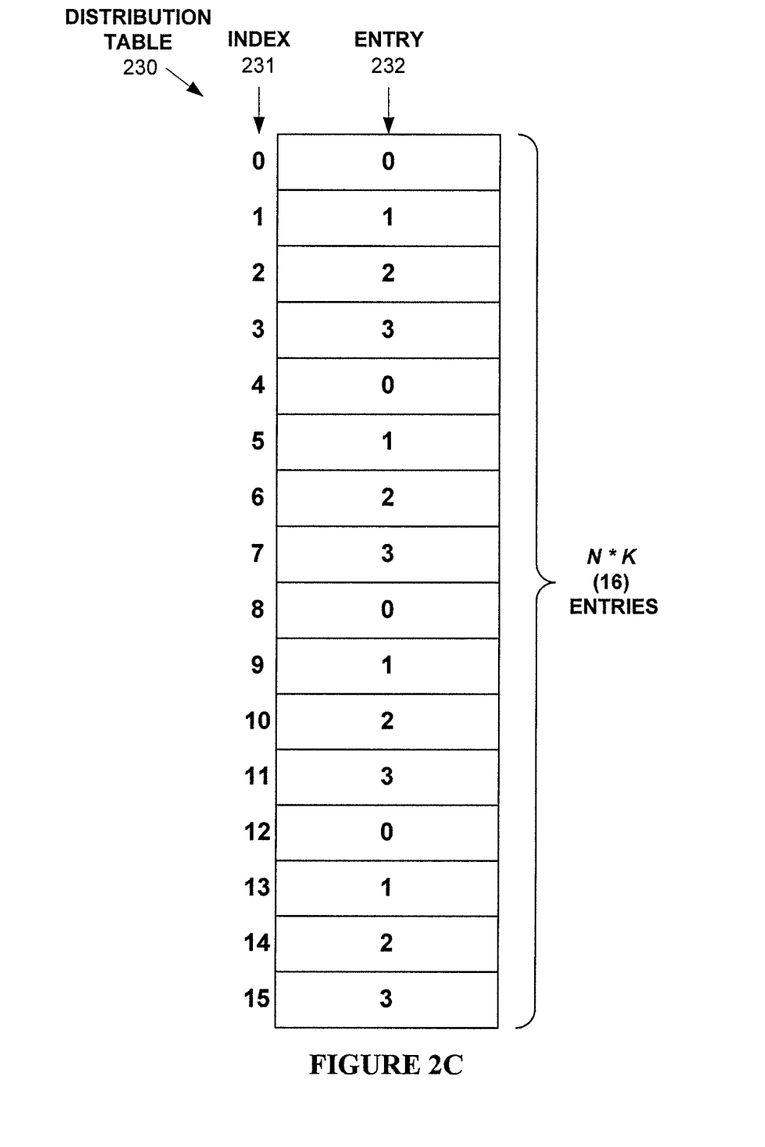
FIG. 2C illustrates a data structure used in one embodiment.

FIG. 2C illustrates a distribution table 230 used in one embodiment. As shown, distribution table 230 includes N*K entries 232, with an index 231 ranging from zero to (N*K)−1 (thus, a hash/remainder or other operation on a packet determines a corresponding value in this range). In this example, there are four (N=4) groups (202, FIG. 2A) with K=N=4 groups (202) active. Hence, one embodiment uses a distribution table 330 with sixteen entries, with the distribution populated in entries 232 as shown for this example, which continues with reference to FIGS. 3A-C.

Figure 3A:
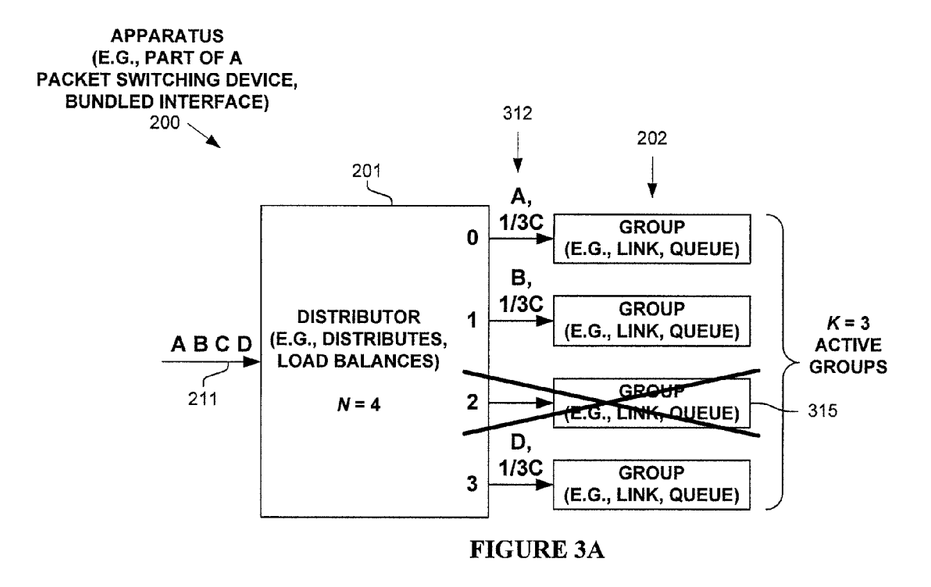
FIG. 3A illustrates an apparatus operating according to one embodiment.

As shown in FIG. 3A, an event has occurred which has taken group 315 out of service for distributor 201 to distribute packets of flows A, B, C and D (211). As shown, one embodiment 200 continues to distribute (312) flows A, B and D to a same group 202 as before the disruptive occurrence, and then evenly distributes (e.g., ⅓ of flow C) to each of the remaining K active groups 202. Note, the term "evenly distributed" in reference to groups 202 is used herein to refer a distribution which spreads the now inactive packet flows over the active K groups 202 in some manner, such as, but not limited to, being based on flows, size, or some other value. The term "evenly distributed" does not require that the number of flows or size is equally distributed, but that the aggregate set of flows that were distributed to previously active, but not inactive, group(s) 202 is now load balanced in some fashion across the remaining active K groups 202. Typically, a hashing function is used in distributing these flows, and the actual amount of even distribution of packets is directly related to the evenness of the hashing function and the actual packet traffic.

Figure 3B:
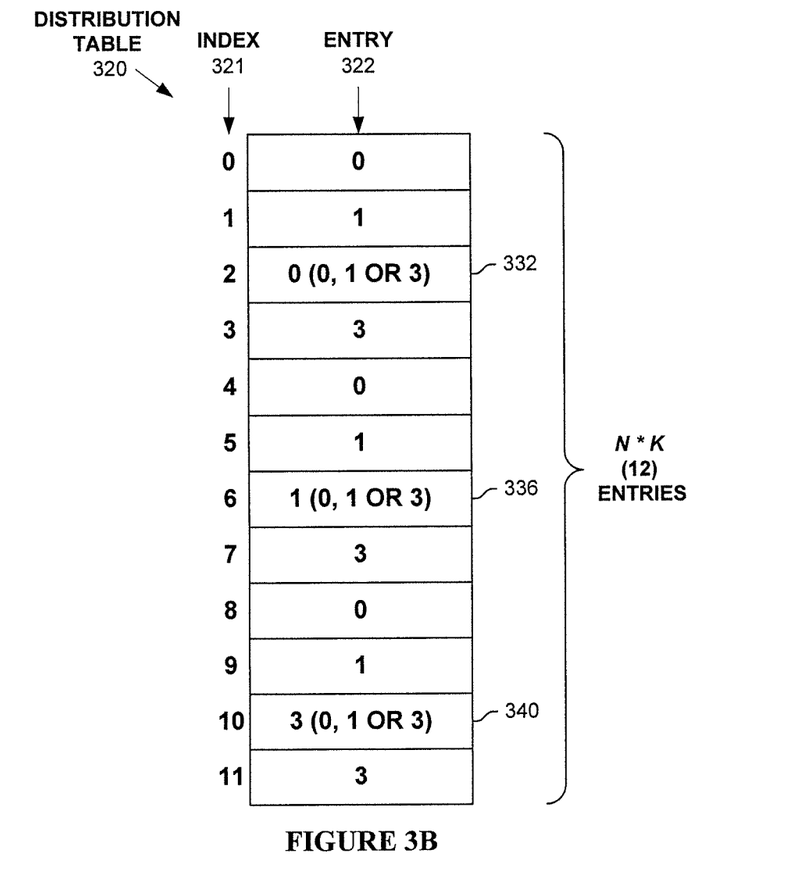
FIG. 3B illustrates a data structure used in one embodiment.

One embodiment uses a distribution table 320 illustrated in FIG. 3B to determine which active group of the N groups (202) to place a particular packet. The number of entries 322 in distribution table 320 is the lowest common multiple (or a multiple thereof) of N and K, which allows packets of the now inactive links to be evenly distributed to the K active groups 202. In this example of one embodiment, the least common multiple of four and three is twelve. Therefore, distribution table 320 includes twelve entries 322 with an index 321 ranging from zero to eleven. One embodiment performs this distribution based on a hashing of a packet (and possibly applying some other function(s) such as a remainder of the size of distribution table 320) to determine the index 321 to use, with the value of the corresponding entry 322 identifying which group 202 (of FIG. 3A) to which to distribute the packet.

As shown in FIG. 3B, in contrast to FIG. 2B, each of entries 332, 336 and 340 corresponding to the now inactive group 315 (FIG. 3A) of groups 202, is changed to indicate one of the remaining active K groups 202. By populating entries 332, 336 and 340 with a value reflective of a different one of the remaining active groups 202, the inactive groups 202 are evenly distributed over the K active groups 202. Again, the actual packet traffic distribution may not be equal across all active groups 202, as that may depend on the hashing function and packet traffic.

Figure 3C:
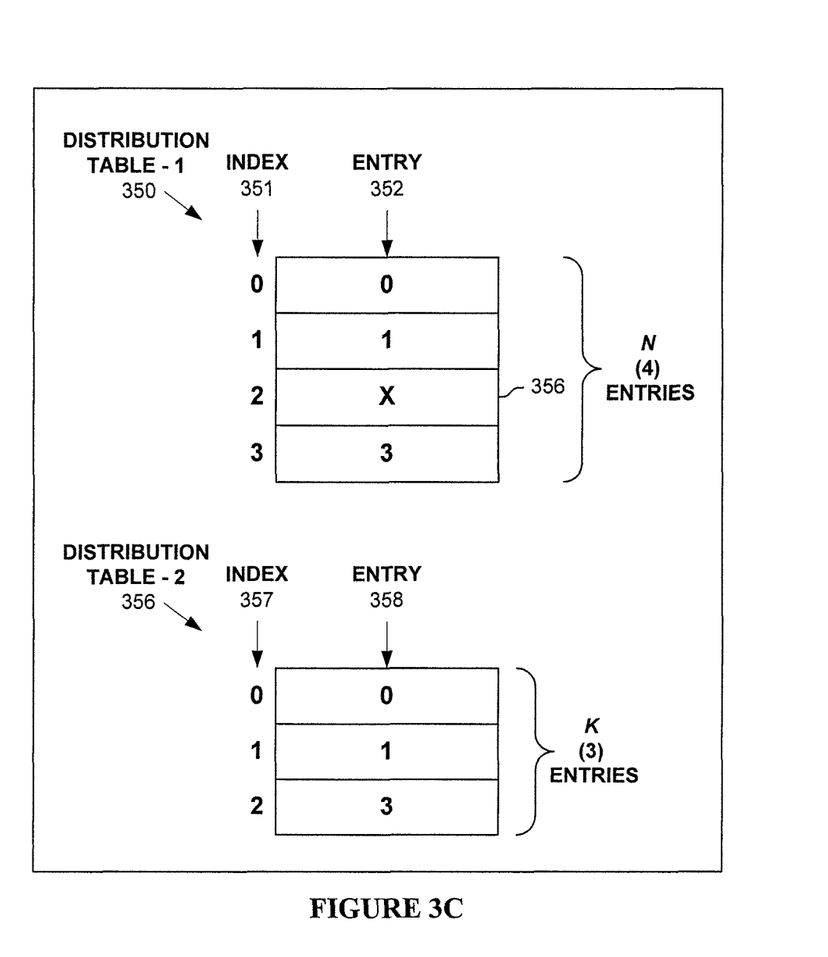
FIG. 3C illustrates a data structure used in one embodiment.

FIG. 3C illustrates a different set of data structures 350 and 356 used in one embodiment. As shown, distribution table-1 (350) is of size N entries (352). A hashing function (and possibly one or more other operations) is applied to a packet to generate an index 251 ranging from zero to N−1. If the corresponding entry 352 represents one of the active K groups (202, FIG. 3A), then the packet is distributed accordingly. Otherwise, a second hashing function (and possibly one or more other operations) is applied to the packet to generate an index 357 ranging from zero to K−1. The corresponding entry 358 in distribution table-2 356 represents one of the active K groups (202, FIG. 3A) to which the packet is distributed accordingly. Note, each of entries 358 identifies a different one of the active K groups (202). Hence traffic of the currently inactive, but previously active, group (202) is evenly distributed over one of the active K groups (202). Again, the amount of equal distribution or load balancing across the active K groups (202) will depend on the hashing functions used, as well as the actual packet traffic.

Note, one embodiment, in response to an inactive group (that was previously active and one of the N groups) becoming active, reverts to a previous distribution scheme where a portion of the distribution to the groups is moved to the active link. An example of this is illustrated by migrating from the distribution illustrated and described in relation FIGS. 3A, and B or C to that illustrated in FIGS. 2A, and B or C. In other words, the 'C' traffic (illustrated in these figures) which was previously redirected among the three remaining active groups (202, FIG. 3A) is redirected to its original group (202, FIG. 2A).

Figure 4:
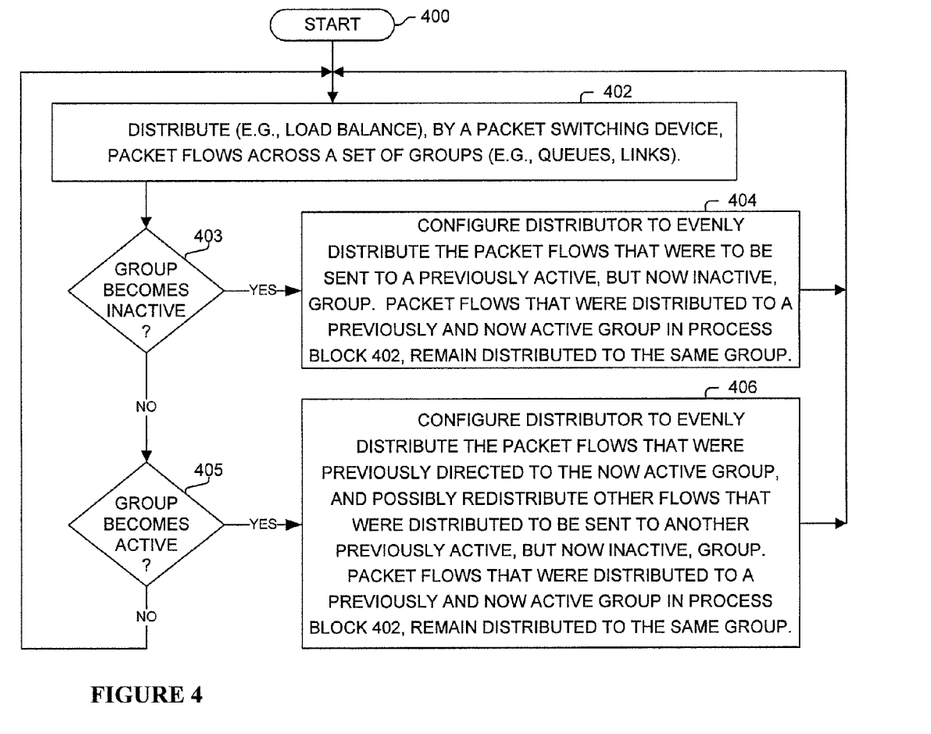
FIG. 4 illustrates a process performed in one embodiment.

FIG. 4 illustrates a process performed in one embodiment. Processing begins with process block 400. In process block 402, a packet switching device distributes, possibly load balancing, packet flows across a set of groups (e.g., queues, links).

As determined in process block 403, if one or more of the active groups changes to inactive, then processing proceeds to process block 404, wherein the distributor is configured (e.g., modify the operation of process block 402) to evenly distribute packet flows that were to be sent to the new inactive group(s) across the active groups. Packet flows that were to be sent to an active group will remain being distributed to the active group.

Otherwise, as determined in process block 405, if one or more of the inactive groups changes to active, then processing proceeds to process block 406, wherein the distributor is configured (e.g., modify the operation of process block 402) to redistribute packet flows that were to be sent to the new active group(s), such as, but not limited to, returning the distributor's configuration to distribute these packet flows as originally distributed. Packet flows that were to be sent to an active group will remain being distributed to the active group.

Processing returns to process block 402.

Figure 5:
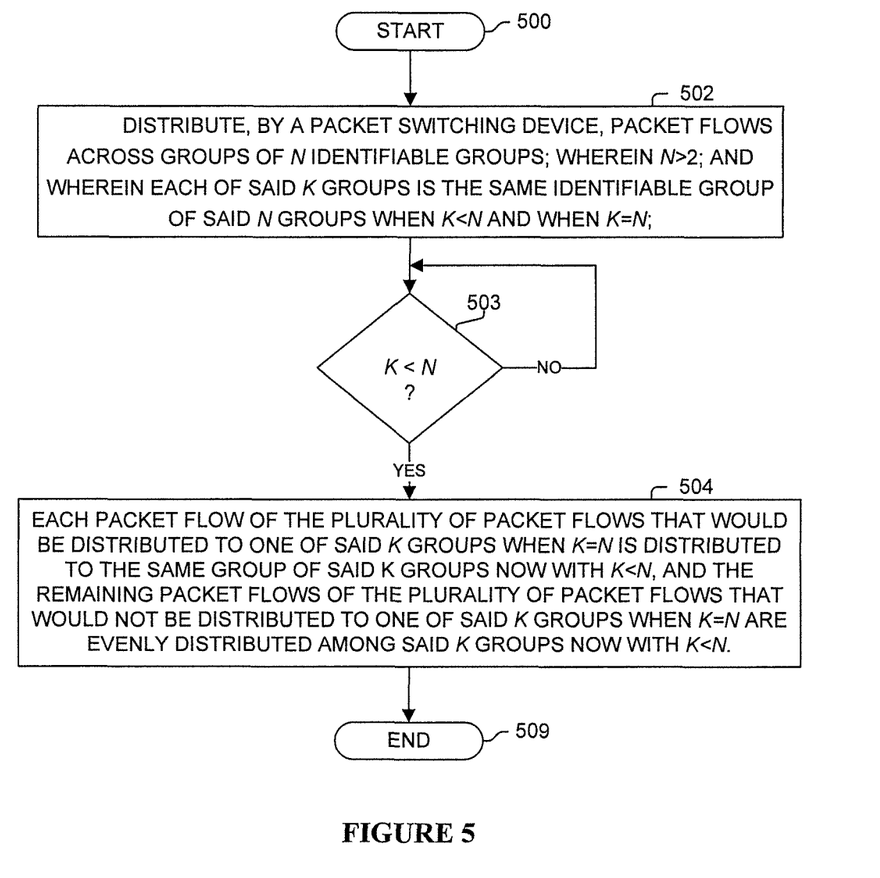
FIG. 5 illustrates a process performed in one embodiment.

FIG. 5 illustrates a process performed in one embodiment. Processing begins with process block 500. In process block 502, a packet switching device distributes a plurality of packet flows across K identifiable groups of N groups; wherein N>2; and wherein each of said K groups is the same identifiable group of said N groups when K<N and when K=N. As determined in process block 503, when K<N, in process block 504 each packet flow of the plurality of packet flows that would be distributed to one of said K groups when K=N is distributed to the same group of said K groups now with K<N, and the remaining packet flows of the plurality of packet flows that would not be distributed to one of said K groups when K=N are evenly distributed among said K groups now with K<N. Processing of the flow diagram of FIG. 5 is complete as illustrated by process block 509.

Figure 6:
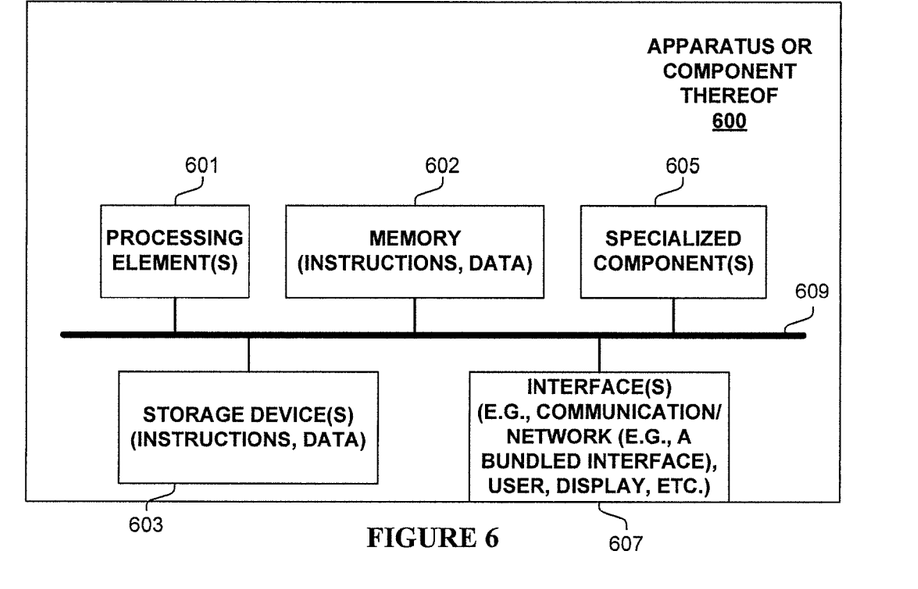
FIG. 6 illustrates an apparatus or component used in one embodiment.

FIG. 6 is block diagram of an apparatus or component 600 used in one embodiment associated with the reassignment of distributed packet flows among groups, such as, but not limited to, queues or links. In one embodiment, apparatus or component 600 performs one or more processes corresponding to one of the flow diagrams and/or sequence of network changes illustrated or otherwise described herein.

In one embodiment, apparatus or component 600 includes one or more processing element(s) 601, memory 602, storage device(s) 603, specialized component(s) 605 (e.g. optimized hardware such as for performing operations, etc.), and interface(s) 607 for communicating information (e.g., sending and receiving packets possibly via a bundled interface, user-interfaces, displaying information, etc.), which are typically communicatively coupled via one or more communications mechanisms 609, with the communications paths typically tailored to meet the needs of the application. In one embodiment apparatus or component 600 corresponds to, or is part of, network device 101 of FIG. 1.

Various embodiments of apparatus or component 600 may include more or less elements. The operation of apparatus or component 600 is typically controlled by processing element(s) 601 using memory 602 and storage device(s) 603 to perform one or more tasks or processes. Memory 602 is one type of computer-readable/computer-storage medium, and typically comprises random access memory (RAM), read only memory (ROM), flash memory, integrated circuits, and/or other memory components. Memory 602 typically stores computer-executable instructions to be executed by processing element(s) 601 and/or data which is manipulated by processing element(s) 601 for implementing functionality in accordance with an embodiment. Storage device(s) 603 are another type of computer-readable medium, and typically comprise solid state storage media, disk drives, diskettes, networked services, tape drives, and other storage devices. Storage device(s) 603 typically store computer-executable instructions to be executed by processing element(s) 601 and/or data which is manipulated by processing element(s) 601 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
   distributing, by a packet switching device, a plurality of packet flows across K identifiable groups of N groups; wherein N>2; and wherein each of said K groups is the same identifiable group of said N groups when K<N and when K=N; wherein said distributing includes distributing at least one flow of the plurality of packet flows to each of said K groups;
   wherein when K<N: each packet flow of the plurality of packet flows that would be distributed to one of said K groups when K=N is distributed to the same group of said K groups now with K<N, and the remaining packet flows of the plurality of packet flows that would not be distributed to one of said K groups when K=N are evenly distributed among said K groups now with K<N.

2. The method of claim 1, wherein each of said N groups corresponds to different, non-overlapping sets of one or more physical links.

3. The method of claim 1, wherein each of said N groups corresponds to different, non-overlapping sets of one or more queues.

4. The method of claim 1, wherein said distributing includes: applying one or more hashing functions; and performing one or more lookup operations in one or more distribution tables populated to identify which of said K groups to said distribute a particular packet of one of the plurality of packet flows.

5. The method of claim 1, wherein said distributing includes: for each particular packet of a plurality of particular packets of the plurality of packet flows: performing a lookup operation in a distribution table to determine to which particular group of said K groups to distribute the particular packet; and distributing the particular packet to the particular group.

6. The method of claim 5, wherein K<N; and wherein each of L entries in the distribution table is populated with a value for use in identifying a corresponding one of said K groups during said distributing operation; wherein L is a least common multiple of K and N, or a multiple thereof.

7. The method of claim 6, wherein each of said N groups corresponds to a different physical link.

8. The method of claim 1, wherein K<N; and wherein said distributing includes: for each particular packet of a plurality of particular packets of the plurality of packet flows: performing a lookup operation in a first distribution table to identify to which particular group of said K groups to distribute the particular packet when so populated, and when not said populated with an identification corresponding to one of said K groups: to use a second distribution table to said identify to which said particular group of said K groups to said distribute the particular packet.

9. The method of claim 8, wherein each of the entries in the first distribution table corresponding to one of said K groups is populated with the identification of a particular one of said K groups; and each entry in the first distribution table corresponding to a group no longer in said K groups, but was in said K groups when K=N, identifies an entry in the second distribution table which is populated with the identification of a particular one of said K groups.

10. An apparatus of a packet switching device, the apparatus comprising: N groups of queues or links; and a distributor configured to distribute a plurality of packet flows across K identifiable groups of said N groups of queues or links;

wherein N>2; and wherein each of said K groups is the same identifiable group of said N groups of queues or links when K<N and when K=N; wherein when said K<N: each packet flow of the plurality of packet flows that would be distributed to one of said K groups when said K=N is distributed to the same group of said K groups now with said K<N and the remaining packet flows of the plurality of packet flows that would not be distributed to one of said K groups when said K=N are distributed among said K groups now with said K<N.

11. The apparatus of claim 10, wherein the apparatus is a bundled interface.

12. The apparatus of claim 10, wherein each of said N groups of queues or links corresponds to different, non-overlapping sets of one or more physical links.

13. The apparatus of claim 10, wherein said configuration to distribute includes: for each particular packet of a plurality of particular packets of the plurality of packet flows: performing a lookup operation in a distribution table to determine to which particular group of said K groups to distribute the particular packet; and distributing the particular packet to the particular group; and
wherein K<N; and wherein each of L entries in the distribution table is populated with a value for use in identifying a corresponding one of said K groups during said distributing operation; wherein L is a least common multiple of K and N, or a multiple thereof.

14. The apparatus of claim 10, wherein K and wherein said configuration to distribute includes: for each particular packet of a plurality of particular packets of the plurality of packet flows: performing a lookup operation in a first distribution table to identify to which particular group of said K groups to distribute the particular packet when so populated, and when not said populated with an identification corresponding to one of said K groups: to use a second distribution table to said identify to which said particular group of said K groups to said distribute the particular packet.

15. The apparatus of claim 14, wherein each of the entries in the first distribution table corresponding to one of said K groups is populated with the identification of a particular one of said K groups; and each entry in the first distribution table corresponding to a group no longer in said K groups, but was in said K groups when K=N, identifies an entry in the second distribution table which is populated with the identification of a particular one of said K groups.

16. The apparatus of claim 10, wherein each of said N groups of queues or links corresponds to a different queue.

17. The apparatus of claim 10, wherein each of said N groups of queues or links corresponds to a different link.

18. A method, comprising: load balancing, by a packet switching device, a plurality of packet flows across K identifiable links of N links; wherein N>2; and wherein each of said K links is the same identifiable link of said N links when K<N and when K=N; wherein when said K<N: each packet flow of the plurality of packet flows that would be sent over one of said K links when said K=N is load balanced to the same link of said K links now with said K<N, and the remaining packet flows of the plurality of packet flows that would not be load balanced to one of said K links when said K=N are evenly distributed among said K links now with K<N.

19. The method of claim 18, wherein the method is performed by a bundled interface of the packet switching device.

* * * * *

UNITED STATES PATENT AND TRADEMARK OFFICE
CERTIFICATE OF CORRECTION

PATENT NO. : 8,619,568 B2  
APPLICATION NO. : 13/021084  
DATED : December 31, 2013  
INVENTOR(S) : Ding et al.

Page 1 of 1

It is certified that error appears in the above-identified patent and that said Letters Patent is hereby corrected as shown below:

In The Claims

Col. 11, Claim 14, line 1, replace "wherein K and" with -- wherein K<N; and --

Signed and Sealed this  
Thirteenth Day of January, 2015

Michelle K. Lee  
*Deputy Director of the United States Patent and Trademark Office*